United States Patent
Hoffmann et al.

(10) Patent No.: US 10,446,029 B2
(45) Date of Patent: Oct. 15, 2019

(54) METHOD AND DEVICE FOR OPERATING A PARKING LOT

(71) Applicant: Robert Bosch GmbH, Stuttgart (DE)

(72) Inventors: Stefan Hoffmann, Bietigheim (DE); Rolf Nicodemus, Bietigheim-Bissingen (DE); Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/517,583

(22) PCT Filed: Sep. 29, 2015

(86) PCT No.: PCT/EP2015/072338
§ 371 (c)(1),
(2) Date: Apr. 7, 2017

(87) PCT Pub. No.: WO2016/066354
PCT Pub. Date: May 6, 2016

(65) Prior Publication Data
US 2017/0309177 A1     Oct. 26, 2017

(30) Foreign Application Priority Data
Oct. 27, 2014   (DE) .......................... 10 2014 221 771

(51) Int. Cl.
*G08G 1/14* (2006.01)
*G01C 21/34* (2006.01)
(Continued)

(52) U.S. Cl.
CPC ......... *G08G 1/148* (2013.01); *G01C 21/3407* (2013.01); *G01C 21/362* (2013.01);
(Continued)

(58) Field of Classification Search
CPC .. G08G 1/148; G08G 1/096811; G08G 1/127; G08G 1/146; G08G 1/164
See application file for complete search history.

(56) References Cited

U.S. PATENT DOCUMENTS

| | | | | |
|---|---|---|---|---|
| 3,798,592 A | * | 3/1974 | Lilly .................... | G08G 1/095 340/908 |
| 2005/0104745 A1 | * | 5/2005 | Bachelder ............... | F41G 9/00 340/906 |
| 2012/0326890 A1 | * | 12/2012 | Cross ..................... | G08G 1/082 340/906 |

FOREIGN PATENT DOCUMENTS

| | | |
|---|---|---|
| DE | 19961175 A1 | 6/2001 |
| DE | 102009029720 A1 | 12/2010 |

(Continued)

OTHER PUBLICATIONS

International Search Report dated Nov. 30, 2015 of the corresponding International Application PCT/EP2015/072338 filed Sep. 29, 2015.
(Continued)

*Primary Examiner* — Michael D Lang
(74) *Attorney, Agent, or Firm* — Norton Rose Fulbright US LLP; Gerard Messina

(57) ABSTRACT

A method and device of a parking system includes, for example, a computer program configured for operating a parking lot, including the steps of ascertaining a route to a target position in the parking lot for autonomous travel of a vehicle in the parking lot to the target position, and blocking at least one section of the route to other vehicles before the vehicle travels through the section, so that the vehicle is able to drive autonomously through the blocked-off section of the route.

13 Claims, 2 Drawing Sheets

(51) Int. Cl.
  *G01C 21/36* (2006.01)
  *G08G 1/16* (2006.01)
  *G08G 1/0968* (2006.01)
  *G08G 1/127* (2006.01)

(52) U.S. Cl.
  CPC ....... *G08G 1/096811* (2013.01); *G08G 1/127* (2013.01); *G08G 1/146* (2013.01); *G08G 1/149* (2013.01); *G08G 1/164* (2013.01)

(56) References Cited

FOREIGN PATENT DOCUMENTS

| | | |
|---|---|---|
| DE | 102012021282 A1 | 4/2014 |
| DE | 102012222562 A1 | 6/2014 |
| EP | 2695797 A2 | 2/2014 |
| JP | H0533516 A | 2/1993 |
| JP | 2002334392 A | 11/2002 |
| JP | 2007293611 A | 11/2007 |
| KR | 1020100093359 | 5/2014 |

OTHER PUBLICATIONS

Ibisch, et al.: "Towards highly automated driving in a parking garage: General object localization and tracking using an environment-embedded camera system." 2014 IEEE Intelligent Vehicles Symposium Proceedings, Jun. 8, 2014, pp. 426-431.

* cited by examiner

METHOD AND DEVICE FOR OPERATING A PARKING LOT

CROSS-REFERENCE TO RELATED APPLICATIONS

The present application is the national stage of International Pat. App. No. PCT/EP2015/072338 filed Sep. 29, 2015, and claims priority under 35 U.S.C. § 119 to DE 10 2014 221 771.7, filed in the Federal Republic of Germany on Oct. 27, 2014.

FIELD OF THE INVENTION

The present invention relates to a parking system, a computer program a method, and a device for operating a parking lot.

BACKGROUND

In what is generally known as fully automated (autonomous) valet parking, a driver parks his vehicle at a drop-off point, such as in front of a parking garage, and from there the vehicle then drives on its own to a parking position/parking bay and back again to the drop-off point.

The laid-open document KR 1020120031778 A shows that a parking lot is monitored for the presence of traffic with the aid of a video camera. When traffic is detected, a corresponding signal is generated. Alarm measures are taken as a function of the signal.

SUMMARY

Example embodiments of the present invention reduce a risk to vehicles and/or to people in an autonomous valet parking operation.

According to an example embodiment, a method, device, system, and/or computer program for operating a parking lot reduces a risk to vehicles and/or persons in an autonomous valet parking operation.

According to example embodiment of the present invention, a method for operating a parking lot includes: ascertaining a route for the autonomous travel of a vehicle in the parking lot to a target position within the parking lot; and blocking off at least one section of the route to other vehicles before the vehicle travels the section, so that the vehicle is able to drive autonomously through the blocked-off section of the route.

According to an example embodiment, a device for operating a parking lot includes a control device for controlling a blocking-off operation of at least one section of an ascertained route to a target position within the parking lot, for an autonomously driving vehicle before the vehicle travels through the section, so that the vehicle is able to drive autonomously through the blocked-off section of the route.

In an example, the device includes a processor, which is designed to ascertain the route to the target position within the parking lot, and a communications interface, which is designed to transmit the route via a communications network to the vehicle for the autonomous travel in the parking lot to the target position.

In an example, the device furthermore includes a communications interface, which is designed to receive the ascertained route via the communications network.

Thus, according to an example embodiment, a device for operating a parking lot includes: a processor, which is designed to ascertain a route to a target position within the parking lot; a communications interface, which is designed to transmit the route via a communications network to a vehicle for the autonomous travel in the parking lot to the target position; and a control device for controlling a blocking-off operation of at least one section of the route before the vehicle drives through the section, so that the vehicle is able to drive through the blocked-off section of the route in an autonomous manner.

According to an example embodiment, a device for operating a parking lot includes: a communications interface, which is designed to receive (in particular from a vehicle) via a communications network an ascertained route for the autonomous travel of a vehicle in the parking lot to the target position; and a control device for controlling a blocking-off operation of at least one section of the route before the vehicle travels through the section, so that the vehicle is able to travel autonomously through the blocked-off section of the route.

In an example, a combination of the two aforementioned devices is provided, which means that the communications interface is appropriately designed to receive an ascertained route and to transmit an ascertained route, and to do so via a communications network.

According to a still further aspect, a parking system is provided, which encompasses a parking lot and the device according to the present invention.

According to another aspect, a computer program is provided, which includes program code for carrying out the method of the present invention when the computer program is executed on a computer.

The present invention thus particularly encompasses the idea of blocking off at least one section (and preferably the entire route) of the route to other vehicles, so that the vehicle is able to travel autonomously through the blocked-off section of the route. This provides the particular technical advantage of reducing or excluding a danger to other vehicles and/or to persons. In particular, this advantageously allows for a reduction or exclusion of a collision risk. In this way, it is also advantageously possible that autonomously driving vehicles as well as non-autonomously driving vehicles, i.e., vehicles that must still be controlled by a driver, are both able to drive in the parking lot. In other words, a mixed operation of autonomously driving vehicles and non-autonomously driving vehicles is able to take place. This is possible because at least one section of the route through which the autonomously driving vehicle is to travel is blocked to other vehicles, i.e., also to vehicles not driving autonomously. As a result, it is advantageously impossible to encounter situations that are possibly not quite clear with regard to the right of way. Between people, such situations are often regulated via hand signals. This is normally not possible with an autonomously driving vehicle. Because such situations are avoidable on account of the blocking, it is consequently possible to avoid the potential problems resulting therefrom. In particular a collision risk is able to be reduced.

According to a specific embodiment, the route is transmitted via a communications network to the vehicle for the autonomous travel in the parking lot to the target position. Here, the route is thus ascertained off-board the vehicle, for instance with the aid of the device for operating a parking lot according to the present invention.

According to another specific embodiment, the route is ascertained on-board the vehicle and transmitted via a communications network to a user of the communications network. The user is preferably the device for operating a parking lot according to the present invention. Thus, the user, in particular the device, is then able to block off the section.

If specific embodiments are described in light of this description in which the route is transmitted via the communications network to the vehicle, then this always also means that the route is ascertained on-board the vehicle and transmitted via a communications network to a user of the communications network.

For the on-board ascertainment, it is particularly provided that a digital map (parking lot map) be transmitted to the vehicle via the communications network, e.g., with the aid of the device.

According to a specific embodiment, the route is blocked off completely while the vehicle is traveling the route. Therefore, this specifically means that sections of the road that have not yet been traveled or were already traveled by the vehicle are blocked off as well. This has the advantage of providing for a simple and efficient execution of the method insofar as only a single complete blockage of the route is necessary, without having to consider whether sections not yet traveled or sections already traveled by the vehicle should perhaps not be unblocked for additional vehicles after all. This simplifies the execution of the method in an advantageous manner.

According to another specific embodiment, it is provided that the blocked-off section be released again after the vehicle has passed through it. This therefore means that the blockage or barricade is canceled again. In other words, other vehicles and/or persons are able to drive or walk through the released section again. This advantageously results in efficient traffic routing or an efficient traffic control in the parking lot.

According to a specific embodiment, multiple sections of the road are blocked off before the vehicle passes through them, so that the vehicle is able to drive autonomously through the respective blocked-off section of the route. For example, there may be situations in which it is useful to block off only some sections to other vehicles and thus not the entire route.

According to a specific embodiment, the entire route is blocked all at once or successively.

In another specific embodiment, it is provided that sections of the route be successively blocked for the vehicle during its travel along the route and that they be unblocked again after the corresponding travel has taken place. Thus, this means that when the vehicle is located on a first level of a parking garage and intends to drive to the fourth level autonomously, sections of the route to be traveled on the second and third levels need not yet be blocked. They may therefore remain open to further traffic. This makes it possible to optimize a traffic flow in the parking lot in an advantageous manner.

According to another specific embodiment, the blocking off includes a control of one or more signal generators and/or a control of a barrier. A signal generator, for example, emits a red signal light for a blocking operation. The release includes a control of the signal generator in such a way that it emits a green signal light. A control of a barrier for blocking off the section particularly includes a barrier closure. A release of the blocked-off section particularly includes a control of the barrier such that it is opened.

That is to say, a control of one or more signal generator(s) and/or a control of a barrier is/are provided as possible blocking measures. Consequently, one or more signal generator(s) emit(s) a red signal light for the blocking. For the blocking, it is particularly provided that a barrier be closed and, to release the section, it is particularly provided that the closed barrier be opened. To release the blocked-off section, it is particularly provided that the signal generator(s) emit a green signal light.

The signal generator(s) and/or the barrier are thus specifically part of an infrastructure of the parking lot, and the signal generator(s) and/or the barrier is/are specifically able to block or unblock sections that intersect with or terminate in the route, i.e., especially the section in this case. This has the advantageous result that traffic traveling on these routes in the direction of the section or the route is induced to stop. In other words, the traffic has to wait.

According to a specific embodiment, multiple barriers are provided.

According to a specific embodiment, a start signal is activated or released for travel through the section after the section has been blocked off to other vehicles. This is advantageous insofar as the vehicle is informed of the fact that the section is closed and that it is now able to drive through the blocked-off section in an autonomous manner.

According to a specific embodiment, the start signal is a signal light from a signal generator, in particular a green signal light. In other words, the activation of the start signal means that the signal generator emits a green signal light. A start signal in particular may also encompass the opening of a barrier, which therefore means that the activation of the start signal includes the opening of a barrier.

In another specific embodiment, it is provided that the start signal be transmitted to the vehicle, preferably via the communications network. In other words, independently of a signal generator and/or a barrier, the vehicle obtains knowledge of the fact that the section is blocked off, so that the vehicle is now able to drive autonomously through the blocked-off section of the route. Thus, an independence from an infrastructure such as a barrier or a signal generator is provided.

In another specific embodiment, combinations of the aforementioned specific embodiments with regard to the start signal are provided. This means that both a signal generator and/or a barrier and/or a transmission of a start signal via the communications network is/are provided in order to signal to the vehicle that the section is blocked off.

In another specific embodiment, a check is provided as to whether or not the section is free, and a start signal for the travel through the section is activated only if the check has revealed that the section is free. This achieves the specific technical advantage of ensuring that the vehicle travels the section only if no other vehicles and/or persons are present in said section. A danger for additional vehicles or persons is thus able to be reduced even further. In particular a collision risk is advantageously reduced or even eliminated entirely in this way.

According to a specific embodiment, a monitoring system includes one or more video camera(s) that may also be called monitoring cameras. According to a specific embodiment, monitoring of the autonomous travel of the vehicle in the parking lot is provided with the aid of the monitoring system, which consequently means that the autonomous travel of the vehicle in the parking lot is monitored by the monitoring system according to a specific embodiment. The monitoring system is specifically provided to check whether or not the section of the route is free.

According to a specific embodiment, it is provided that the section be blocked to persons. In this way an endangerment of persons is advantageously reduced even further in that they are now addressed directly to be informed that they may not enter the section. The blocking especially of persons in particular includes the control of one or more signal generator(s) and/or one or more barrier(s) specifically intended for persons, e.g., a pedestrian signal generator. Such a signal generator includes a mask in the form of a pictogram of a person, for example.

In another specific embodiment, the autonomously driving vehicle and/or another autonomously driving vehicle (or vehicles) is/are stopped if a problem is discovered during the monitoring that is relevant for the autonomous travel (of the vehicle and/or of at least one of the other vehicles). This advantageously avoids an increased risk for the vehicle or for other vehicles or persons on account of the detected problem. The reason is that a stopped vehicle usually constitutes a lesser risk than an autonomously driving vehicle. The stopping of the vehicle or vehicles in particular involves a transmission of a stop signal via the communications network to the vehicle. In response to the stop signal, the autonomously driving vehicle stops according to a specific embodiment. The stopping of the vehicle in particular includes a control of one or more signal generator(s) and/or a control of one or more barrier(s) as already discussed earlier, i.e., in that the signal generator(s) emit(s) a red signal light or in that the barrier is closed.

For example, a problem that is relevant for the autonomous travel is present if an obstacle for the autonomously driving vehicle is located on the route or in the section.

Problems within the meaning of the present invention are, for example: pedestrians, vehicles leaving a parking position (especially if these are "manual" vehicles), parking operations that have not yet been concluded; critical locations with regard to driving maneuvers (such as tight spots).

In another specific embodiment, the autonomous travel of the vehicle in the parking lot is optically recorded. For example, the monitoring system is used for the optical recording of the autonomous travel. The optical recording of the autonomous travel of the vehicle in the parking lot has the particular advantage that the autonomous travel can be reconstructed and analyzed even at a later point in time. This is advantageous and useful for potential evidentiary purposes, in particular.

A target position within the meaning of the present invention in particular is a parking position at which the vehicle is meant to park autonomously. A target position within the meaning of the present invention in particular is a drop-off position at which a driver of a vehicle may leave the vehicle, with this drop-off position then functioning as a starting position for an autonomous parking operation. In other words, in the autonomous parking operation, the vehicle drives autonomously from the drop-off position to the parking position, in particular when traveling the route. More specifically, the vehicle drives autonomously from the parking position back to the drop-off position. This means in particular that a section of the route from the drop-off position to the parking position or vice versa is blocked off before the vehicle travels through the section.

Specific embodiments of the device and the parking system analogously result from the specific embodiments with regard to the method, and vice versa. Corresponding comments made in connection with the method apply analogously to the device and to the parking system, and vice versa.

For example, a parking lot management system coordinates an allocation of the parking positions.

A parking lot within the meaning of the present invention may also be referred to as a parking area and is used as parking space for vehicles. The parking lot thus forms a continuous area that encompasses a plurality of parking positions (in the case of a parking lot on private property) or a plurality of parking spots (in case of a parking lot on public property). According to a specific embodiment, the parking lot can be part of an enclosed parking structure. In particular, the parking lot is part of a garage.

Autonomous within the meaning of the present invention particularly means that the vehicle navigates or drives on its own, i.e., without intervention by a driver. Thus, the vehicle drives in the parking lot by itself without a driver having to control the vehicle in order to do so. In other words, the driver need not be inside the vehicle. Such an autonomously driving vehicle that is able to park and unpark automatically is also referred to as an AVP vehicle, for example. AVP is the abbreviation of "automatic parking valet" and may be translated as "automatic parking operation." Vehicles without this AVP functionality are referred to as normal vehicles, for example.

According to a specific embodiment, the communications network includes a WLAN and/or a mobile telephony network.

A drop-off position within the meaning of the present invention is a position at which a driver of the vehicle is able to leave the vehicle for an autonomous parking operation and from where the driver can pick up the vehicle again at a later point in time.

A parking position within the meaning of the present invention is a position at which the vehicle is meant to park autonomously.

In a specific embodiment, it is provided that the vehicle navigate from the drop-off position to the parking position in an autonomous manner.

In a further specific embodiment, the vehicle autonomously parks in the parking position.

In another specific embodiment, the vehicle autonomously unparks from the parking position.

According to a further specific embodiment, the vehicle navigates autonomously from the parking position to the drop-off position.

Corresponding sections of the route that the vehicle takes during its autonomous travel (e.g., from the drop-off position to the parking position or from the parking position to the drop-off position) are thus blocked off according to a specific embodiment.

According to a specific embodiment, the route leads from the drop-off position to the parking position.

According to a specific embodiment, the route leads from the parking position to the drop-off position.

According to a specific embodiment, the route leads from the drop-off position to the parking position and back again from the parking position to the drop-off position.

Thus, according to a specific embodiment, the route includes a starting position (drop-off position or parking position) and a target position (drop-off position or parking position), with the starting position and the target position being encompassed by the parking lot, for example.

According to a specific embodiment, the communications interface is designed to stop the autonomously driving vehicle (e.g., an AVP vehicle) and/or other autonomously driving vehicles (e.g., additional AVP vehicles) if a problem arises during the autonomous travel. The communications interface transmits stop signals to the vehicles and/or controls signal generators (singular is meant to be included) so that they emit red signal light and/or it controls the barriers (singular is meant to be included) so that they close. According to a specific embodiment, a monitoring system, which includes, for example, one or more video camera(s), is provided for detecting a problem. The processor, for instance, evaluates the data from the monitoring system, such as the video images of the video camera, and generates the stop signals.

In the following text, the present invention will be explained in greater detail on the basis of preferred exemplary embodiments.

DETAILED DESCRIPTION

Figure 1:
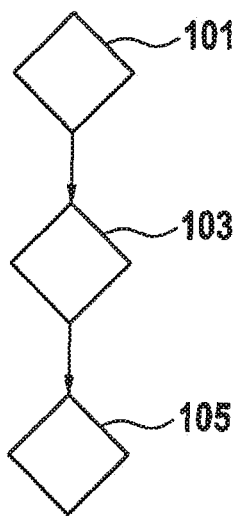
FIG. 1 a flowchart of a method for operating a parking lot, according to an example embodiment of the present invention.

FIG. 1 shows a flowchart of a method for operating a parking lot. According to a step 101, a route to a target position within the parking lot is ascertained. The target position is a parking position or a drop-off position, for example.

In a step 103, the route is transmitted via a communications network to a vehicle for autonomous travel in the parking lot to the target position. The vehicle is preferably an AVP vehicle. Alternatively, the route can also be ascertained on-board the vehicle and be transmitted to a user of the communications network via the communications network.

In a step 105, at least one section of the route, and preferably a plurality of sections (preferably the entire route), is blocked off to additional vehicles before the vehicle travels through the section, so that the vehicle is able to drive autonomously through the blocked-off section of the route.

In a specific embodiment that is not shown, it is determined whether or not the section is free, and only if the check has revealed that the section is free will a start signal be activated for travel through the section.

Figure 2:
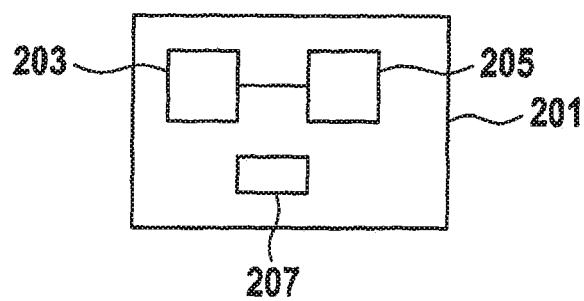
FIG. 2 a device for operating a parking lot, according to an example embodiment of the present invention.

FIG. 2 shows a device 201 for operating a parking lot. Device 201 includes a processor 203, which is designed to ascertain a route to a target position within the parking lot. Device 201 furthermore includes a communications interface, which is set up to transmit the route via a communications network to a vehicle for autonomous travel in the parking lot to the target position. In addition, device 201 includes a control unit 207 for controlling a blocking-off operation of at least one section of the route before the vehicle passes through the section, so that the vehicle is able to drive autonomously through the blocked-off section of the route.

Control unit 207, for example, is in operative connection with one or more signal generator(s) and/or one or more barrier(s). Thus, this specifically means that the control unit is able to control a signal generator or multiple signal generators so that the signal generators emit a red or a green signal light in response to the control. To block off the section, the signal generator emits a red signal light, and to release the section, the signal generator emits a green signal light. Thus, the control unit in particular is able to control a barrier or multiple barriers in such a way that it/they is/are opened or closed in response to the control. The barriers are closed to block the section, and the barriers are opened to unblock it.

A device which ascertains the route on its own and transmits it to the vehicle was described in FIG. 2. In a specific embodiment that is not shown, a device is provided which receives an ascertained route from a vehicle and blocks off at least one section of the route in accordance with the route received. The vehicle thus ascertains the route on its own.

Figure 3:
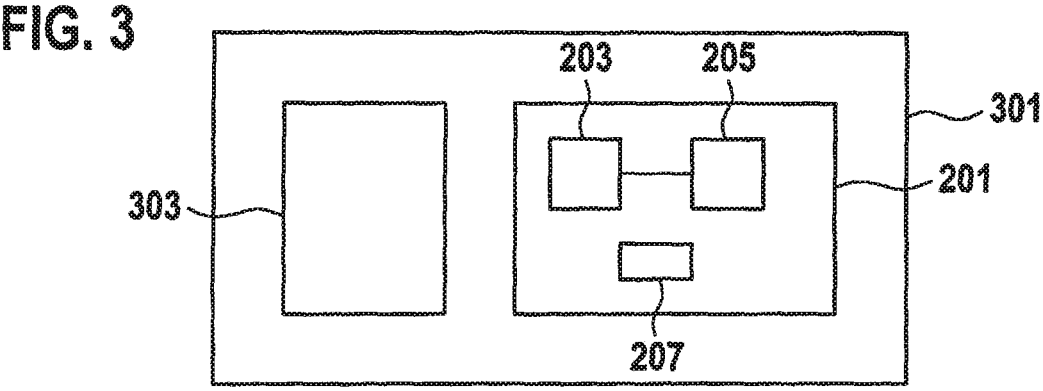
FIG. 3 a parking system according to an example embodiment of the present invention.

FIG. 3 shows a parking system 301. Parking system 301 includes a parking lot 303 as well as a device 201 from FIG. 2.

Figure 4:
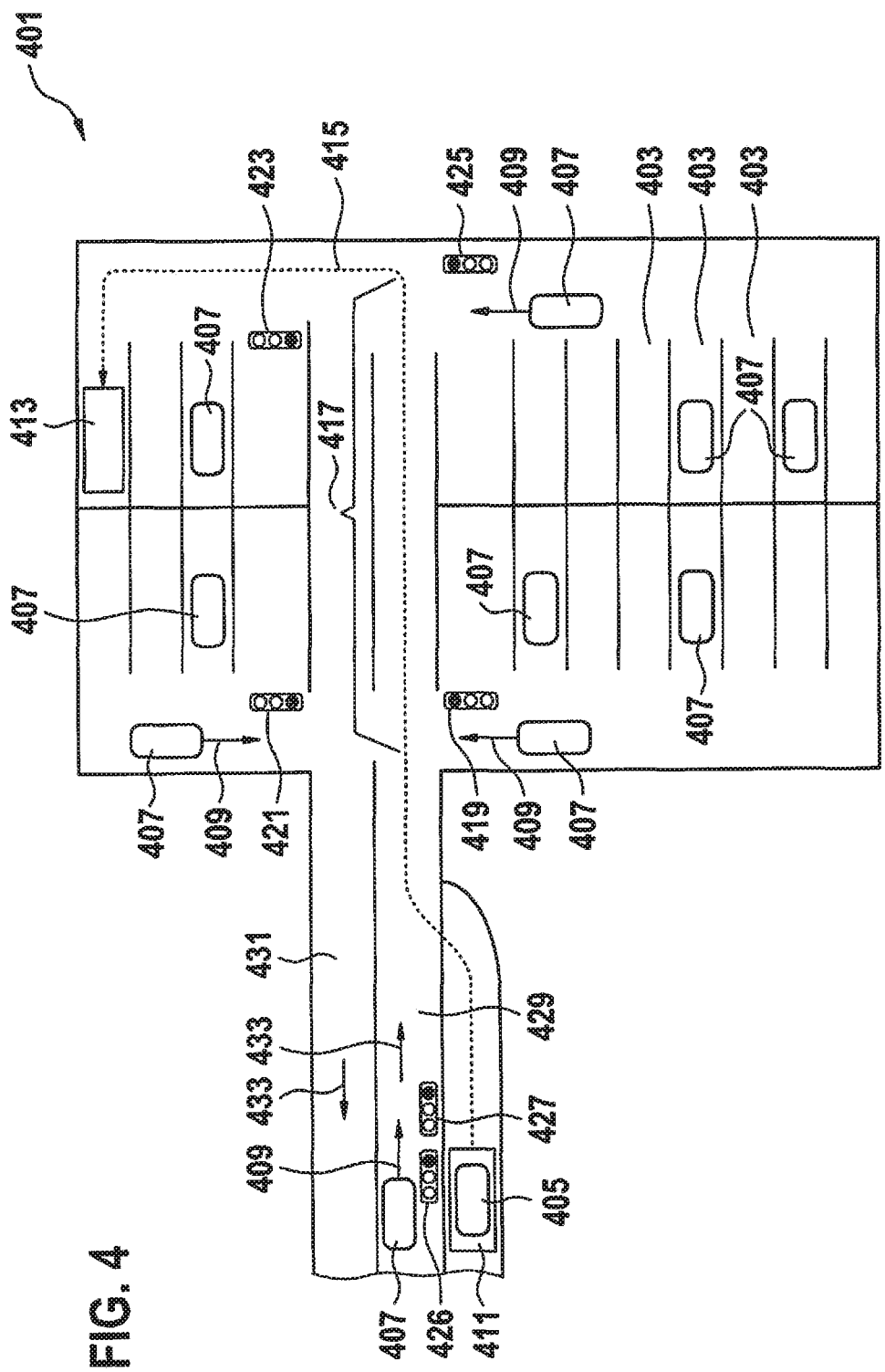
FIG. 4 a parking lot according to an example embodiment of the present invention.

FIG. 4 shows a parking lot 401. Parking lot 401 encompasses a plurality of parking positions 403 in which vehicles can park. For instance, parking lot 401 is developed as an enclosed parking structure, for example, as a garage or as an enclosed parking structure including a garage.

Reference numeral 405 points to an AVP vehicle, i.e., a vehicle that is able to drive autonomously in a parking lot and is able to park autonomously. Reference numeral 407 points to other vehicles that are located in the parking lot. Other vehicles 407 in particular can be non-autonomously driving vehicles, i.e., normal vehicles. Other vehicles 407 in particular can also be AVP vehicles. In other words, a mixed operation of AVP and non-AVP vehicles can exist in parking lot 401.

There is usually a high risk of collision in such a mixed operation because situation may arise that are easily controllable by hand signals between persons. However, this is normally not possible between a person and an autonomously traveling vehicle, i.e., a vehicle not necessarily occupied by a driver. A control of a certain traffic situation by way of a hand signal between two autonomously driving vehicles is also not possible as a rule. Such a certain situation may particularly pertain to the right of way, for instance, i.e., a situation in which it is not always clear which vehicle has the right of way; in other words, the vehicles do not necessarily know whether or not they have the right of way.

However, the present invention provides for a blocking-off of at least one section of a route to a target position located within parking lot 401. The target position, which has been denoted here by reference numeral 413, is a parking position. A starting position for the route, which is denoted by reference numeral 411, is a drop-off position. AVP vehicle 405 has been left at drop-off position 411 by its driver.

Now, a route from drop-off position 411 to parking position 413 is determined. The determined route has been drawn in by a dashed line and provided with reference numeral 415.

If one of vehicles 405, 407 is depicted with an arrow 409, then this is meant to symbolically indicate that these vehicles are not parking but rather are part of the moving traffic, even if they have to wait due to the blocking.

A section of route 415 is symbolically marked by a curly bracket bearing reference numeral 417. To block off this section 417 of route 415, five signal generators 419, 421, 423, 425, 426 are provided, which are located at corresponding junctions of a route leading to this section 417. These signal generators emit a red signal light for the blocking, thereby signaling to other vehicles 407 that they have to wait at the junction.

A signal generator 427 is also situated in the region of drop-off position 411. This signal generator 427 emits a red signal light until section 417 is blocked off, i.e., until signal generators 419, 421, 423, 425, 426 emit a red signal light.

Preferably, a predefined wait time will elapse after signal generators 419, 421, 423, 425, 426 have been switched to a red signal light before signal generator 427 is switched to a green signal light.

In a further specific embodiment, it is checked whether section 417 is free before signal generator 427 is switched to the green signal light. In other words, signal generator 427 switches to the green signal light only if section 417 is free. The check is carried out in particular with the aid of a monitoring system, which includes one or more video camera(s), for example.

Reference numerals 429 and 431 symbolically point to two traffic lanes. Reference numeral 433 points to arrows that symbolically indicate a driving direction in the two traffic lanes 429, 431.

Thus, the present invention encompasses the idea of providing a method, a device, a parking system as well as a computer program, which make it possible to avoid traffic problems, such as problems with mixed traffic or with a mixed operation. The described example embodiments of the present invention include blocking off the travel path, i.e., the route, or parts thereof, and especially blocking it off with the aid of a parking lot management, for the duration of the autonomous driving operation of the AVP vehicle in the parking lot, i.e., in particular from the drop-off point (drop-off position) to the parking position/parking bay or also vice versa. In other words, the mixed operation in the blocked-off section is prohibited or prevented during this time, in particular.

Thus, when an AVP vehicle is to drive to the target position and to park there on its own, the travel route will be blocked to other vehicles by traffic lights and/or barriers. In this instance, other vehicles are manually driven vehicles and/or other AVP vehicles. Preferably, the start signal is output to the AVP vehicle only after the route is clear.

Preferably, as little of the route as possible will be blocked. In other words, only the path that the AVP vehicle will take is blocked off, preferably also only sections. When the AVP vehicle is to drive to the third level of a parking garage, for instance, only the ground level, for example, is blocked for as long as the AVP vehicle is still located at the ground level. The first, second, and third levels will not be blocked yet and thus remain open to other vehicles.

In a further refinement stage (specific embodiment), the path is closed to people as well.

In addition, according to a specific embodiment, it is advantageous that the parking lot management system monitors the process and the travel route of the AVP vehicle and, if warranted, preferably intervenes in the event of problems, such as stops the AVP vehicle.

Moreover, according to a specific embodiment, it is advantageous that the parking lot management system visually documents the entire operation for evidentiary purposes.

What is claimed is:

1. A method for operating an autonomous valet parking lot, the method comprising:
    ascertaining, by a processor of processing circuitry of a device for operating the autonomous valet parking lot, a route to a target position within the autonomous valet parking lot for autonomous travel of a vehicle in the autonomous valet parking lot to the target position; and
    controlling at least one signal light generator and a barrier, which is openable and closable, by a control unit of the processing circuitry, to block other vehicles from at least one section of the route before the vehicle passes through the section so that the vehicle is drivable autonomously through the blocked-off section of the route;
    wherein there are a plurality of signal light generators and barriers in the autonomous valet parking lot, and
    wherein the plurality of signal light generators and barriers in the autonomous valet parking lot are controlled so that other vehicles from at least one section of the route are blocked before the vehicle passes through the section so that the vehicle is drivable autonomously through the blocked-off section of the route, which is blocked off to the other vehicles.

2. The method of claim 1, further comprising:
    checking whether the section is free, and activating a start signal for travel of the section conditional upon that the check has revealed that the section is free.

3. The method of claim 1, wherein the section is blocked to persons.

4. The method of claim 1, further comprising:
    a monitoring system monitoring the autonomous travel of the vehicle in the autonomous valet parking lot.

5. The method of claim 4, further comprising:
    stopping at least one of the autonomously driving vehicle and another autonomously driving vehicle in response to a detection, by the monitoring, of a problem that is relevant for the autonomous travel.

6. The method of claim 1, further comprising:
    optically recording the autonomous travel of the vehicle in the autonomous valet parking lot.

7. The method of claim 1, further comprising:
    transmitting, via a communications network and to the vehicle, the route for autonomous travel in the autonomous valet parking lot to the target position.

8. The method of claim 1, wherein the route is ascertained on-board the vehicle and is transmitted, from the vehicle and via a communications network, to a user of the communications network.

9. A device for operating an autonomous valet parking lot, comprising:
    processing circuitry; and
    a communications interface;
    wherein the processing circuitry is configured to control, via the communications interface, at least one signal light generator and a barrier, which is openable and closable, to block at least one section of a route of an autonomously driving vehicle to a target position within the autonomous valet parking lot before the vehicle travels through the section, so that the vehicle is drivable autonomously through the blocked-off section of the route,
    wherein there are a plurality of signal light generators and barriers in the autonomous valet parking lot, and
    wherein the plurality of signal light generators and barriers in the autonomous valet parking lot are controlled so that other vehicles from at least one section of the route are blocked before the vehicle passes through the section so that the vehicle is drivable autonomously through the blocked-off section of the route, which is blocked off to the other vehicles.

10. The device of claim 9, wherein the processing circuitry is configured to ascertain the route transmit the ascertained route via the communications interface and a communications network to the vehicle for autonomous travel in the autonomous valet parking lot to the target position.

11. The device of claim 9, wherein the processing circuitry is configured to receive the ascertained route from a communications network via the communications interface.

12. An autonomous valet parking system, comprising:
an autonomous valet parking lot; and
a device for operating the autonomous valet parking lot;
wherein the device includes processing circuitry having a processor, a control unit and a communications interface, wherein the processing circuitry is configured to control, via the communications interface, at least one signal light generator and a barrier, which is openable and closable, to block at least one section of a route of an autonomously driving vehicle to a target position within the autonomous valet parking lot before the vehicle travels through the section, so that the vehicle is drivable autonomously through the blocked-off section of the route,
wherein there are a plurality of signal light generators and barriers in the autonomous valet parking lot, and
wherein the plurality of signal light generators and barriers in the autonomous valet parking lot are controlled so that other vehicles from at least one section of the route are blocked before the vehicle passes through the section so that the vehicle is drivable autonomously through the blocked-off section of the route, which is blocked off to the other vehicles.

13. A non-transitory computer readable medium having a computer program, which is executable by a processor, comprising:
a program code arrangement having program code for operating an autonomous valet parking lot, by performing the following:
ascertaining, by a processor of processing circuitry of a device for operating the autonomous valet parking lot, a route to a target position within the autonomous valet parking lot for autonomous travel of a vehicle in the autonomous valet parking lot to the target position; and
controlling at least one signal light generator and a barrier, which is openable and closable, by a control unit of the processing circuitry, to block other vehicles from at least one section of the route before the vehicle passes through the section so that the vehicle is drivable autonomously through the blocked-off section of the route;
wherein there are a plurality of signal light generators and barriers in the autonomous valet parking lot, and
wherein the plurality of signal light generators and barriers in the autonomous valet parking lot are controlled so that other vehicles from at least one section of the route are blocked before the vehicle passes through the section so that the vehicle is drivable autonomously through the blocked-off section of the route, which is blocked off to the other vehicles.

* * * * *